(12) United States Patent
Kim

(10) Patent No.: US 9,802,643 B2
(45) Date of Patent: Oct. 31, 2017

(54) FAIL SAFE APPARATUS AND METHOD FOR MDPS SYSTEM

(71) Applicant: HYUNDAI MOBIS CO., LTD., Seoul (KR)

(72) Inventor: Dong Hee Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 67 days.

(21) Appl. No.: 14/750,619

(22) Filed: Jun. 25, 2015

(65) Prior Publication Data

US 2016/0090118 A1 Mar. 31, 2016

(30) Foreign Application Priority Data

Sep. 30, 2014 (KR) ........................ 10-2014-0130964

(51) Int. Cl.
| | |
|---|---|
| *B62D 5/00* | (2006.01) |
| *B62D 5/04* | (2006.01) |
| *G01S 19/52* | (2010.01) |
| *G01S 19/49* | (2010.01) |

(52) U.S. Cl.
CPC ........... *B62D 5/049* (2013.01); *B62D 5/0463* (2013.01); *G01S 19/49* (2013.01); *G01S 19/52* (2013.01)

(58) Field of Classification Search
None
See application file for complete search history.

(56) References Cited

U.S. PATENT DOCUMENTS

| | | | |
|---|---|---|---|
| 2008/0294342 A1* | 11/2008 | Hoshizaki | ............ G01C 21/165 701/472 |
| 2010/0204862 A1* | 8/2010 | Uejima | .................. B60K 6/445 701/22 |

FOREIGN PATENT DOCUMENTS

KR 10-2005-0026710 A 3/2005

* cited by examiner

*Primary Examiner* — James M McPherson
(74) *Attorney, Agent, or Firm* — Knobbe Martens Olson & Bear LLP

(57) ABSTRACT

A fail safe apparatus for an MDPS system may include: a vehicle speed sensor configured to measure a vehicle speed; a gear stage input unit configured to receive a gear stage from a transmission of the vehicle; a GPS vehicle speed calculation unit configured to calculate a GPS vehicle speed based on location information of the vehicle; and a control unit configured to determine whether the vehicle speed is an error, based on one or more of the vehicle speed, the gear stage, and the GPS vehicle speed, and determine vehicle speed data of the MDPS system based on one or more of the gear stage and the GPS vehicle speed.

8 Claims, 3 Drawing Sheets

FIG. 2

| GEAR STAGE | 1 | 2 | 3 | 4 |
|---|---|---|---|---|
| VEHICLE SPEED RANGE | 0~30kph | 0~60kph | 40~120kph | 80kph~MAXIMUM SPEED |
| FAIL SAFE VEHICLE SPEED | 15kph | 30kph | 80kph | 120kph |

FAIL SAFE APPARATUS AND METHOD FOR MDPS SYSTEM

CROSS-REFERENCES TO RELATED APPLICATIONS

The present application claims priority to Korean application number 10-2014-0130964, filed on Sep. 30, 2014, which is incorporated by reference in its entirety.

BACKGROUND

The present disclosure relates to a fail safe apparatus and method for a motor driven power steering (MDPS) system, and more particularly, to a fail safe device and method for an MDPS system A power steering of a vehicle assists a driver to operate a steering wheel. Such a power steering generally uses hydraulic pressure. Recently, however, the use of an MDPS system which uses a motor force has increased. That is because the MDPS system has a smaller weight and occupies a smaller area than conventional hydraulic power steering systems, and does not require an oil change.

The related technology is disclosed in Korean Patent Laid-open Publication No. 10-2005-0026710 published on Mar. 16, 2005.

SUMMARY

Embodiments of the present invention are directed to a fail save device and method for an MDPS system, which is capable of detecting various error situations of vehicle speed data of the MDSP system, and providing a suitable steering feel to a driver when vehicle speed data is determined to be an error.

In one embodiment, a fail safe apparatus for an MDPS system may include: a vehicle speed sensor configured to measure a vehicle speed; a gear stage input unit configured to receive a gear stage from a transmission of the vehicle; a GPS vehicle speed calculation unit configured to calculate a GPS vehicle speed based on location information of the vehicle; and a control unit configured to determine whether the vehicle speed is an error, based on one or more of the vehicle speed received through the vehicle speed sensor, the gear stage inputted through the gear stage input unit, and the GPS vehicle speed received from the GPS vehicle speed calculation unit, when the vehicle speed is equal to or less than a preset maximum speed, and determine vehicle speed data of the MDPS system based on one or more of the gear stage and the GPS vehicle speed, when the vehicle speed is not received through the vehicle speed sensor, the vehicle speed is exceeding the maximum speed, or the vehicle speed is determined to be an error.

When determining whether the vehicle speed is an error, the control unit may determine whether the vehicle speed deviates from a vehicle speed range corresponding to the gear stage among preset vehicle speed ranges for respective gear stages, and determine that the vehicle speed is an error in case where duration of the state in which the vehicle speed received through the vehicle speed sensor deviates from the vehicle speed range exceeds a first critical time.

When determining whether the vehicle speed is an error, the control unit may determine whether a difference between the vehicle speed and the GPS vehicle speed is equal to or more than a critical value, in case where the GPS vehicle speed is normally received, and determine that the vehicle speed is an error in case where duration of the state in which the difference between the vehicle speed received through the vehicle speed sensor and the GPS vehicle speed received from the GPS vehicle speed calculation unit is equal to or more than the critical value exceeds a second critical time.

When determining the vehicle speed data of the MDPS system, the control unit may determine the GPS vehicle speed as the vehicle speed data of the MDPS system, in case where the GPS vehicle speed is normally received.

When determining the vehicle speed data of the MDPS system, the control unit may determine a speed corresponding to the gear stage, among preset speeds for respective gear stages, as the vehicle speed data of the MDPS system, in case where the GPS vehicle speed is not normally received.

In another embodiment, a fail safe method for an MDPS system may include: receiving, by a control unit, a vehicle speed through a vehicle speed sensor; receiving a gear stage of the vehicle; receiving a GPS vehicle speed which is calculated based on location information of the vehicle; determining whether the vehicle speed is an error, based on one or more of the vehicle speed, the gear stage, and the GPS vehicle speed, when the vehicle speed is equal to or more than a preset maximum speed; and determining vehicle speed data of the MDPS system based on one or more of the gear stage and the GPS vehicle speed, when the vehicle speed is not received through the vehicle speed sensor, the vehicle speed is exceeding the maximum speed, or the vehicle speed is determined to be an error.

The determining of whether the vehicle speed is an error may include: determining, by the control unit, whether the vehicle speed deviates from a vehicle speed range corresponding to the gear stage, among preset vehicle speed ranges for respective gear stages; and determining that the vehicle speed is an error, when duration of the state in which the vehicle speed received through the vehicle speed sensor deviates from the vehicle speed range exceeds a first critical time.

The determining of whether the vehicle speed is an error may include: determining, by the control unit, whether a difference between the vehicle speed and the GPS vehicle speed is equal to or more than a critical value, when the GPS vehicle speed was normally received; and determining that the vehicle speed is an error, when duration of the state in which the difference between the vehicle speed received through the vehicle speed sensor and the GPS vehicle speed is equal to or more than the critical value exceeds a second critical time.

The determining of the vehicle speed data of the MDPS system may include determining the GPS vehicle speed as the vehicle speed data of the MDPS system, when the GPS vehicle speed was normally received.

The determining of the vehicle speed data of the MDPS system may include determining a speed corresponding to the gear stage, among preset speeds for respective gear stages, as the vehicle speed data of the MDPS system, when the GPS vehicle speed was not normally received.

BRIEF DESCRIPTION OF THE DRAWINGS

FIG. 2 is a table showing a vehicle speed range and a fail safe vehicle speed for each gear stage in the fail safe apparatus for an MDPS system in accordance with an embodiment of the present invention.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Unlike the hydraulic power steering systems, an MDPS system generates a torque by controlling a current of the motor through a control unit such as an electronic control unit (ECU), and thus includes various control logics for controlling the motor. Such control logics include a logic for realizing a steering feel desired by a driver, a logic for improving the stability of a vehicle, and a logic for improving the stability of the system. The control unit of the MDPS system performs the respective logics based on various parameters such as a vehicle speed, a torque signal, and a steering angle signal.

Among the parameters, the vehicle speed is an important factor which has a large influence on the assist amount of the MDPS system. When the vehicle speed is varied from 0 kph (Km/h) to the maximum speed, the assist amount of the MDPS system is varied from 100% to 0%. Thus, the MDPS system includes a fail safe function for an abnormality in a measured vehicle speed.

When a vehicle speed is not measured or received because the vehicle speed exceeded the maximum speed, the fail safe logic for vehicle speed in the MDPS system determines that an abnormality occurred in measuring the vehicle speed, and controls the MDPS system based on a fixed specific value (for example, 80 kph).

However, this method cannot deal with various error situations because an error determination condition for vehicle speed data is simple. Furthermore, since this typical method controls the MDPS system based on the fixed speed, a driver may not have a desired steering feel.

Figure 1:
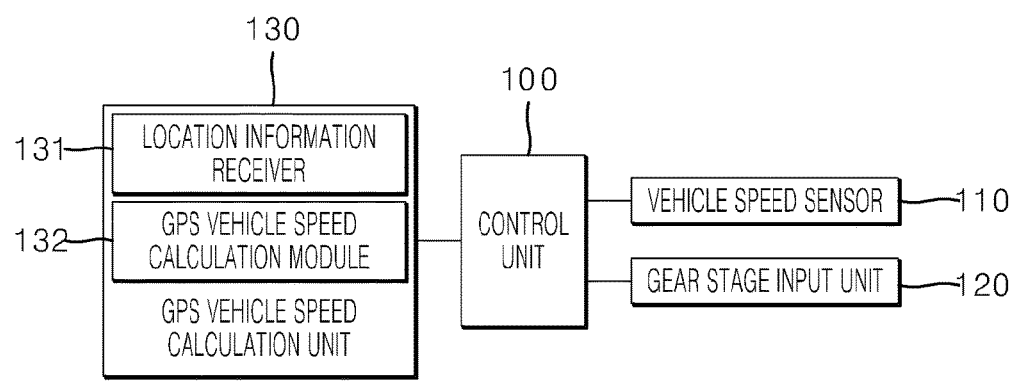
FIG. 1 is a block diagram illustrating the configuration of a fail safe apparatus for an MDPS system in accordance with an embodiment of the present invention.

FIG. 1 is a block diagram illustrating the configuration of a fail safe apparatus for an MDPS system in accordance with an embodiment of the present invention. FIG. 2 is a table showing a vehicle speed range and a fail safe vehicle speed for each gear stage in the fail safe apparatus for an MDPS system in accordance with an embodiment of the present invention. Referring to FIGS. 1 and 2, the fail safe apparatus for an MDPS system in accordance with the embodiment of the present invention will be described as follows.

As illustrated in FIG. 1, the fail safe apparatus for an MDPS system in accordance with the embodiment of the present invention may include a control unit 100, a vehicle speed sensor 110, a gear stage input unit 120, and a GPS vehicle speed calculation unit 130. The GPS vehicle speed calculation unit 130 may include a location information receiver 131 and a GPS vehicle speed calculation module 132.

The vehicle speed sensor 110 may measure the speed of a vehicle. For example, the vehicle speed sensor 110 may measure the vehicle speed by sensing rotation of a transmission output shaft.

The gear stage input unit 120 may receive a gear stage from a transmission of the vehicle. The transmission of the vehicle may include a sensor for sensing a motion of a shift lever, a transmission control unit (TCU) and the like, and export a gear stage of the vehicle to the gear stage input unit 120.

The location information receiver 131 may receive location information of the vehicle. The location information receiver 131 may receive information on the location of the vehicle using a satellite navigation system such as the Global Positioning System (GPS) or Global Navigation Satellite System (GLONASS).

The GPS vehicle speed calculation unit 130 may calculate a GPS vehicle speed which is a vehicle speed based on the location information of the vehicle. That is, the GPS vehicle speed calculation module 132 of the GPS vehicle speed calculation unit 130 may calculate the GPS vehicle speed based on the location information of the vehicle, received through the location information receiver 131. The GPS vehicle speed calculation unit 130 may correspond to a navigation system of a vehicle.

For example, the GPS vehicle speed calculation module 132 may calculate a traveling distance based on the location information of the vehicle at each predetermined time interval, and calculate a GPS vehicle speed by dividing the calculated traveling distance by the predetermined time interval. Furthermore, the GPS vehicle speed calculation module 132 may calculate the GPS vehicle speed using the Doppler effect of the GPS signal or the GLONASS signal received through the location information receiver 131. When the location information of the vehicle is not received through the location information receiver 131, for example, when the vehicle enters a tunnel, the GPS vehicle speed calculation module 132 may not calculate a GPS vehicle speed.

When the GPS vehicle speed is not normally calculated as described above, for example, when the GPS vehicle speed is not calculated or calculated as a value exceeding the maximum speed of the vehicle, the GPS vehicle speed calculation unit 130 may not transmit a GPS vehicle speed to the control unit 100. In this case, the control unit 100 may not normally receive the GPS vehicle speed.

When a vehicle speed equal to or less than a preset maximum speed is received through the vehicle speed sensor 110, the control unit 100 may determine whether the vehicle speed is an error, based on one or more of the vehicle speed received through the vehicle speed sensor 110, the gear stage inputted through the gear stage input unit 120, and the GPS vehicle speed received through the GPS vehicle speed calculation unit 130. That is, even when it is determined that the vehicle speed sensed through the vehicle speed sensor 110 is a normal value, the control unit 100 may verify the vehicle speed sensed through the vehicle speed sensor 110 using the gear stage or the GPS vehicle speed.

For example, the control unit 100 may determine whether the vehicle speed received through the vehicle speed sensor 110 deviates from a vehicle speed range corresponding to the gear stage inputted through the gear stage input unit 120, among the vehicle speed ranges for the respective gear stages. When the duration of the state in which the vehicle speed deviates from the vehicle speed range exceeds a first critical time, the control unit 100 may determine that the vehicle speed is an error.

Referring to FIG. 2 showing the vehicle speed range for each gear stage, a normal vehicle speed range may be previously set according to each gear stage of the vehicle. The control unit 100 may determine whether the vehicle speed received through the vehicle speed sensor 110 deviates from the normal vehicle speed range. For example, when a vehicle speed of 10 kph is received through the vehicle speed sensor 110 in case where the gear stage inputted through the gear stage input unit 120 is the third gear, the control unit 100 may determine that the vehicle speed deviated from the normal vehicle speed range. The vehicle speed range for each gear stage may be designed to various values according to the specification of the vehicle.

When the duration of the state in which the vehicle speed deviates from the vehicle speed range for each gear stage exceeds the first critical time, the control unit 100 may determine that the vehicle speed is an error. The first critical time may be basically preset, and designed to various values according to the specification of the vehicle and the like.

Furthermore, when the GPS vehicle speed is normally received through the GPS vehicle speed calculation unit 130, the control unit 100 may determine whether a difference between the vehicle speed received through the vehicle speed sensor 110 and the GPS vehicle speed is equal to or more than a critical value. When the duration of the state in which the difference between the vehicle speed and the GPS vehicle speed is equal to or more than the critical value exceeds a second critical time, the control unit 100 may determine that the vehicle speed is an error. That is, when the GPS vehicle speed is normally received, the control unit 100 may compare the GPS vehicle speed and the vehicle speed received through the vehicle speed sensor 110, and determine whether the vehicle speed is an error. The critical value and the second critical time may be basically preset, and designed to various values according to the specification of the vehicle and the like.

When the vehicle speed is not received through the vehicle speed sensor 110, the vehicle speed received through the vehicle speed sensor 110 exceeds the maximum speed, or the vehicle speed is determined to be an error, the control unit 100 may determine vehicle speed data of the MDPS system based on one or more of the gear stage inputted through the gear stage input unit 120 and the GPS vehicle speed received through the GPS vehicle speed calculation unit 130. That is, when a vehicle speed is not normally received through the vehicle speed sensor 110 or a vehicle speed is normally received through the vehicle speed sensor 110 but determined to be an error, the control unit 100 may perform a fail safe function to determine the vehicle speed data of the MDPS system.

For example, when the GPS vehicle speed is normally received through the GPS vehicle speed calculation unit 130, the control unit 100 may determine the GSP vehicle speed as the vehicle speed data of the MDPS system. When the GPS vehicle speed is not normally received, the control unit 100 may determine the vehicle speed based on the gear stage inputted through the gear stage input unit 120, among a speed for the respective gear stages, as the vehicle speed data of the MDPS system.

Referring to FIG. 2 showing the speed for each gear stage, a speed used during performance of the fail safe function may be previously set according to each gear stage of the vehicle. The control unit 100 may determine a vehicle speed for performing the fail safe function according to the gear stage inputted through the gear stage input unit 120. For example, when the gear stage inputted through the gear stage input unit 120 is the third gear, the control unit 100 may determine 80 kph as the vehicle data of the MDPS system. The speed for each gear stage may be designed to various values according to the specification of the vehicle or the like.

Figure 3:
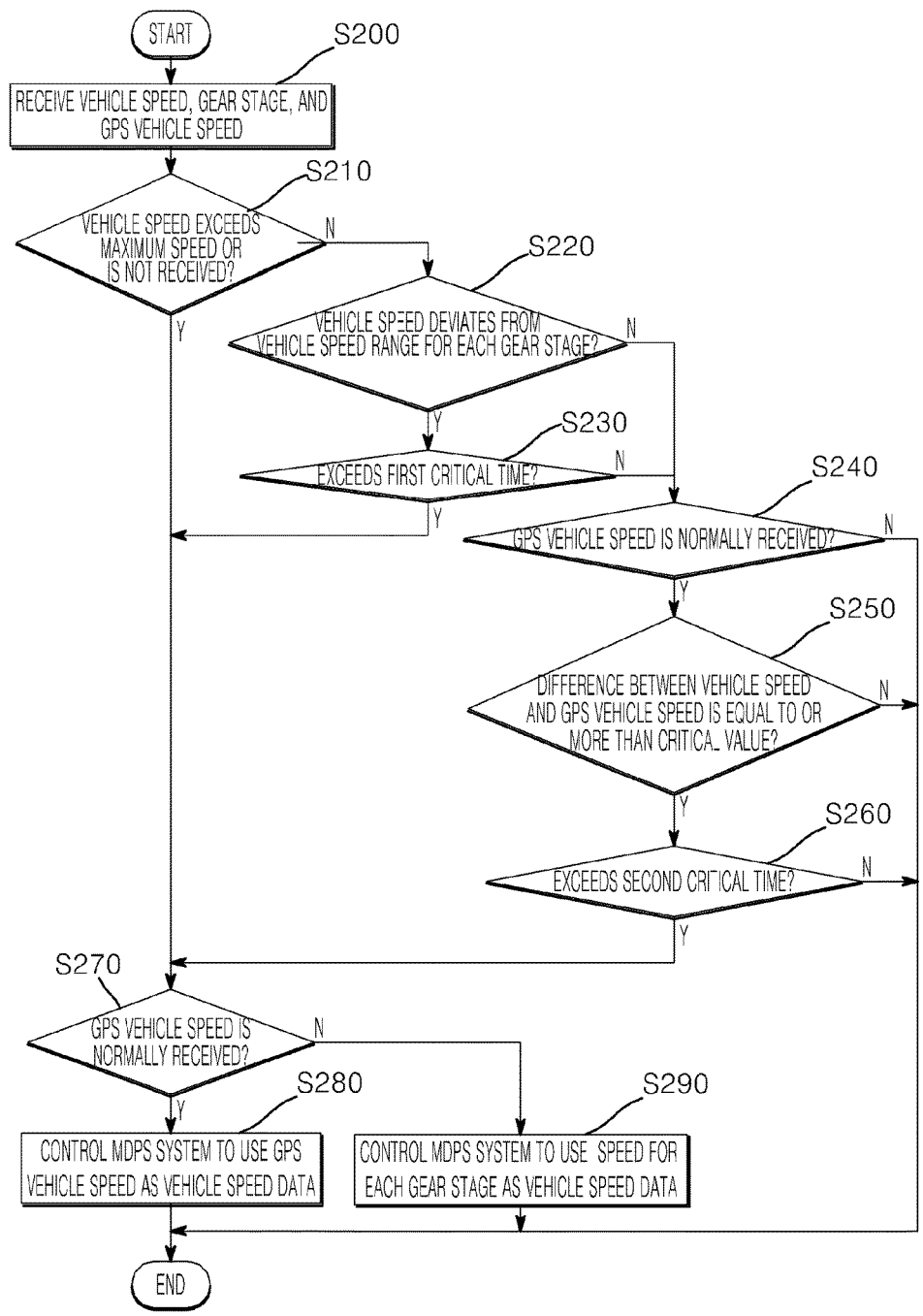
FIG. 3 is a flowchart for describing a fail safe method for an MDPS system in accordance with an embodiment of the present invention.

FIG. 3 is a flowchart for describing a fail safe method for an MDPS system in accordance with an embodiment of the present invention. Referring to FIG. 3, the fail safe method for an MDPS system in accordance with the embodiment of the present invention will be described as follows.

As illustrated in FIG. 3, the control unit 100 may receive a vehicle speed through the vehicle speed sensor 110, receive a gear stage of the vehicle, and receive a GPS vehicle speed which is calculated based on the location information of the vehicle, at step S200. For example, the control unit 100 may receive the gear stage from the transmission of the vehicle, and receive the GPS vehicle speed from the GPS vehicle speed calculation unit 130.

Then, the control unit 100 may check whether the vehicle speed received at step S200 exceeds a preset maximum speed or whether a vehicle speed was not received at step S200, at step S210.

When it is checked at step S210 that the vehicle speed was received at step S200 and did not exceed the maximum speed, the control unit 100 may determine whether the vehicle speed received at step S200 deviated from the vehicle speed range for each gear stage, at step S220. That is, even when a normal value is received as the vehicle speed through the vehicle speed sensor 110, the control unit 100 may verify the vehicle speed received through the vehicle speed sensor 110 using the gear stage.

When it is determined at step S220 that the vehicle speed received at step S200 deviated from the vehicle speed range for each gear stage, the control unit 100 may check whether the duration of the state in which the vehicle speed deviates from the vehicle speed range for each gear stage exceeded a first critical time, at step S230. The first critical time may be basically preset, and designed to various values according to the specification of the vehicle and the like.

When it is checked at step S230 that the duration of the state in which the vehicle speed deviates from the vehicle speed range for each gear stage did not exceed the first critical time, the control unit 100 may check whether the GPS vehicle speed was normally received at step S200, at step S240. For example, when the GPS vehicle speed is not normally calculated, for example, when the GPS vehicle speed is not calculated because the location information of the vehicle was not received or calculated as a value exceeding the maximum speed of the vehicle, the GPS vehicle speed calculation unit 130 may not transmit a GPS vehicle speed to the control unit 100. In this case, the control unit 100 may not normally receive the GPS vehicle speed.

When it is determined at step S220 that the vehicle speed received at step S200 did not deviate from the vehicle speed range for each gear stage, the control unit 100 may proceed to step S240, and check whether the GPS vehicle speed was normally received at step S200. That is, even when a normal value is received as the vehicle speed through the vehicle speed sensor 110 and the received vehicle speed satisfies the vehicle speed range for each gear stage, the control unit 100 may verify the vehicle speed received through the vehicle speed sensor 110 using the GPS vehicle speed.

When it is checked at step S240 that the GPS vehicle speed was normally received, the control unit 100 may determine whether a difference between the vehicle speed received at step S200 and the GPS vehicle speed received at step S200, is equal to or more than a critical value, at step S250. The critical value may be basically preset, and designed to various values according to the specification of the vehicle and the like. That is, the control unit 100 may determine whether the difference between the GPS vehicle speed and the vehicle speed received through the vehicle speed sensor 110 exceeds a predetermined reference value.

When it is checked at step S250 that the difference between the GPS vehicle speed and the vehicle speed is equal to or more than the critical value, the control unit 100 may check whether the duration of the state in which the difference between the vehicle speed and the GPS vehicle speed is equal to or more than the critical value exceeded a second critical time, at step S260. The second critical time may be basically preset, and designed to various values according to the specification of the vehicle and the like. That is, when the state in which the difference between the GPS vehicle speed and the vehicle speed received through the vehicle speed sensor 110 is equal to or more than the critical value continues for a predetermined time, the control unit 100 may determine that the vehicle speed received through the vehicle speed sensor 110 is an error.

When it is checked at step S260 that the duration time of the state in which the difference between the vehicle speed and the GPS vehicle speed is equal to or more than the critical value exceeded the second critical time, the control unit 100 may check whether the GPS vehicle speed was normally received at step S200, at step S270.

When it is checked at step S210 that the vehicle speed received at step S200 exceeded the maximum speed or a vehicle speed was not received at step S200, the control unit 100 may proceed to step S270, and check whether the GPS vehicle speed was normally received at step S200. Furthermore, when it is checked at step S230 that the duration of the state in which the vehicle speed deviates from the vehicle speed range for each gear stage is maintained exceeded the first critical time, the control unit 100 may proceed to the step S270, like the above-described case.

That is, when a vehicle speed is not normally received through the vehicle speed sensor 110 or a vehicle speed is normally received through the vehicle speed sensor 110 but determined to be an error, the control unit 100 may perform a fail safe function to determine the vehicle speed data of the MDPS system. At this time, since the control unit 100 can proceed to step S270 without passing through step S240, the control unit 100 may check whether the GPS vehicle speed was normally received at step S200.

When it is checked at step S270 that the GPS vehicle speed was normally received, the control unit 100 may control the MDPS system to use the GPS vehicle speed received at step S200 as the vehicle speed data, at step S280. That is, when the GPS vehicle speed was normally received, the control unit 100 may determine the GPS vehicle speed received at step S200 as the vehicle speed data of the MDPS system.

On the other hand, when it is checked at step S270 that the GPS vehicle speed was not normally received, the control unit 100 may control the MDPS system to use the fail safe vehicle speed for each gear stage as vehicle speed data, at step S290. That is, when the GPS vehicle speed was normally received, the control unit 100 may determine the speed corresponding to the gear stage inputted at step S200, among the fail safe vehicle speeds for the respective gear stages, as the vehicle speed data of the MDPS system.

As such, the fail safe apparatus and method for an MDPS system in accordance with the embodiments of the present invention may determine whether a vehicle speed is an error based on a gear stage and a GPS speed of the vehicle, and determine vehicle speed data of the MDPS system, thereby securing reliability of the vehicle speed data of the MDPS system and improving steering stability and steering feel.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for controlling a motor driven power steering (MDFS) system of a vehicle, comprising:
    a vehicle speed sensor configured to measure a speed of the vehicle;
    a set of predetermined speed values, each corresponding to one of transmission gear stages of a transmission of the vehicle;
    a global positioning system (GPS) vehicle speed calculation unit configured to calculate a GPS-based speed of the vehicle; and
    a control unit configured to generate MDPS control signals for controlling the MDPS system using the speed of the vehicle from the vehicle speed sensor,
    wherein, when the vehicle speed sensor is in error, the control unit generates the MDFS control signals using, instead of the speed of the vehicle from the vehicle speed sensor, at least one of the GPS-based speed and, a first one of the predetermined speed values corresponding to a current transmission gear stage.

2. The apparatus of claim 1, wherein the control unit determines that the vehicle speed sensor is in error when the speed of the vehicle from the vehicle speed sensor deviates from a predetermined range of vehicle speed corresponding to the current transmission gear stage.

3. The apparatus of claim 1, wherein the control unit determines that the vehicle speed sensor is in error when a difference between the GPS-based speed and the speed of the vehicle from the vehicle speed sensor is greater than a predetermined reference.

4. The apparatus of claim 1, wherein the control unit identifies the first predetermined speed value corresponding of the current transmission gear state when the GPS-based speed from the GPS vehicle speed calculation unit is not available.

5. A method for controlling a motor driven power steering (MDPS) system of a vehicle, the method comprising:
    measuring, by a vehicle speed sensor, a speed of the vehicle;
    generating, by a control unit, MDPS control signals for controlling the MDPS system using the speed of the vehicle from the vehicle speed sensor;
    identifying a current transmission gear stage among a plurality of transmission gear stages of a transmission of the vehicle;
    calculating, by a global positioning system (GPS) vehicle speed calculation unit, a GPS-based speed of the vehicle;
    determining whether the vehicle speed sensor is in error, based on one or more of the speed from the vehicle speed sensor, the current transmission gear stage, and the GPS-based speed; and
    when it is determined that the vehicle speed sensor is in error, by the control unit, generating the MDPS control signals using, instead of the speed of the vehicle from the vehicle speed sensor, at least one of the GPS-based speed and one of a predetermined speed value corresponding to the current transmission gear stage.

6. The method of claim 5, further comprising:
providing a set of predetermined speed values, each corresponding to one of the plurality of transmission gear stages,
wherein the control unit determines that the vehicle speed sensor is in error when the speed of the vehicle from the vehicle speed sensor deviates from a predetermined range of vehicle speed corresponding to the current transmission gear stage.

7. The fail safe method of claim 5, wherein the control unit determines that the vehicle speed sensor is in error when a difference between the GPS-based speed and the speed of the vehicle from the vehicle speed sensor is greater than a predetermined reference.

8. The method of claim 5, wherein the control unit identifies the predetermined speed value corresponding to the current transmission gear stage when the GPS-based speed is not available.

\* \* \* \* \*